(12) United States Patent
Moreira et al.

(10) Patent No.: US 7,721,009 B2
(45) Date of Patent: May 18, 2010

(54) METHOD FOR PROVIDING HIGH PERFORMANCE SCALABLE FILE I/O THROUGH PERSISTENT FILE DOMAIN AND FUNCTIONAL PARTITIONING

(75) Inventors: Jose E. Moreira, Yorktown Heights, NY (US); Ramendra K. Sahoo, Mohegan Lake, NY (US); Hao Yu, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 11/604,162

(22) Filed: Nov. 22, 2006

(65) Prior Publication Data

US 2008/0120435 A1 May 22, 2008

(51) Int. Cl.
*G06F 3/00* (2006.01)
(52) U.S. Cl. .................... 710/5; 710/20; 710/21
(58) Field of Classification Search .......... 710/5, 710/20, 21
See application file for complete search history.

(56) References Cited

U.S. PATENT DOCUMENTS

| | | | |
|---|---|---|---|
| 6,691,116 B1* | 2/2004 | Bart | 707/10 |
| 6,757,753 B1* | 6/2004 | DeKoning et al. | 710/38 |
| 6,820,171 B1* | 11/2004 | Weber et al. | 711/114 |
| 2006/0149714 A1* | 7/2006 | Fellenstein et al. | 707/3 |

OTHER PUBLICATIONS

Lustre Scalable Storage, Cluster File Systems, Inc., 2006.
PVFS2, Parallel Virtual File System, Version 2.
Frank Schmuck and Roger Haskin, GPFS: A Shared-Disk File System for Large Computing Clusters, IBM Almaden Research Center, San Jose, California, USENIX Association Proceedings of the FAST 2002 Conference on File and Storage Technologies, Monterey, California, Jan. 28-30, 2002.
PVFS2, Parallel Virtual File System, Version 2, Oct. 23, 2006.

* cited by examiner

*Primary Examiner*—Niketa I Patel
*Assistant Examiner*—David E Martinez
(74) *Attorney, Agent, or Firm*—Michael J. Buchenhorner; Derek S. Jennings

(57) ABSTRACT

A method for implementing large scale parallel file I/O processing includes steps of: separating processing nodes into compute nodes specializing in computation and I/O nodes (computer processors restricted to running I/O daemons); organizing the compute nodes and the I/O nodes into processing sets, the processing sets including: one dedicated I/O node corresponding to a plurality of compute nodes. I/O related system calls are received in the compute nodes then sent to the corresponding I/O nodes. The I/O related system calls are processed through a system I/O daemon residing in the I/O node. The plurality of compute nodes are evenly distributed across participating processing sets. Additionally, for collective I/O operations, compute nodes from each processing set are assigned as I/O aggregators to issue I/O requests to their corresponding I/O node, wherein the I/O aggregators are evenly distributed across the processing set. Additionally, a file domain is partitioned using a collective buffering technique wherein data is aggregated in memory prior to writing to a file; portions of the partitioned file domain are assigned to the processing sets.

19 Claims, 13 Drawing Sheets

METHOD FOR PROVIDING HIGH PERFORMANCE SCALABLE FILE I/O THROUGH PERSISTENT FILE DOMAIN AND FUNCTIONAL PARTITIONING

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

This invention is directed to the field of accessing input/output (I/O) devices, such as disks in a multi-computer environment. It is particularly directed towards improving computer implemented I/O operations, where a computer represents a cluster of computing nodes.

BACKGROUND OF THE INVENTION

A great deal of demand is placed on high-performance input/output (I/O) systems by data-intensive scientific/commercial applications running on today's most powerful computing systems. While most computationally intensive challenges are handled by emerging massively parallel systems with thousands of processors (e.g. IBM's Blue Gene/L), data-intensive computing with scientific and non-scientific applications still continues to be a major area of interest due to the gap between computation and I/O speed. The seamless transfer of data between memory and a file system for large-scale parallel programs is crucial for useful performance in a high-performance computing environment.

A scalable parallel I/O support in a parallel supercomputer consists mainly of high performance file systems and effective parallel I/O application programming interfaces (API). There have been many efforts in developing parallel file systems for supercomputers, such as GPFS (General Parallel File System) [Refer to F. B. Schmuck and R. L. Haskin, GPFS: a shared-disk file system for large computing clusters, in proceedings of Conference of Files and Storages Technologies (FAST'02), 2002] for IBM SP systems as well as Linux clusters, PVFS [See "PVFS2 Parallel Virtual File System,"] and Lustre [See "Lustre scalable storage," Copyright 2006 Cluster File Systems] for Linux-based platforms. In terms of application programming interfaces, MPI (Message Passing Interface) I/O is synonymous with parallel file I/O for scientific computing, because of its wide use and its base in MPI. MPI I/O supports relatively rich file access patterns and operations for concurrently accessing a single file, which allows aggressive optimizations to be integrated. However, in order to explore I/O performance of data-intensive applications, parallel I/O supports are needed at various levels such as: computation system, file system, and parallel I/O application programming interface (API). GPFS is highly optimized for large-chunk I/O operations with regular access patterns (contiguous or regularly striped). On the other hand, its performance for small-chunk, non-contiguous I/O operations with irregular access patterns (non-constant striped) is less optimized. Particularly, concurrent accesses (from distinct processes) to different file regions in the same GPFS striping-block introduce additional file system activities associated with its file locking mechanism, which can hurt performance.

In the past the extent of computations far exceeded the file I/O operations for scientific applications. However, many of today's large-scale scientific operations require real time data input and output (I/O) thereby increasing demands to provide both large-scale computation and file I/O either simultaneously or at regular or irregular intervals. Such demands for large scale computing result in demands to have both large chunk and small chunk file access both at regular and irregular intervals.

File I/O processes within a computer processor (compute node) start with an initiative from an application communicating with libraries (usually libc) through file scanning operations (fseek). The libraries initiate any read operation within the compute node. A compute node kernel is usually assisted by an input/output (I/O) daemon to talk to the outside world for modern network-based file system (NFS). Any communication to the outside world (including other compute nodes, file system or disks) is carried out through computer networks (referred to as communication tree, Ethernet) by means of sending data as communication packets. These packets normally contain the output results which are communicated to file servers (or disks) to be stored or for any file I/O for further processing or future use.

Referring to FIG. 1 there is shown an example of a basic file I/O mechanism for a simple single-node computer system 100. The Central Processing Unit (CPU) 101 performs a read function, which is re-issued by the operating kernel. The operation is a request to transfer data from disk 104 to memory 103 regions. The CPU directly or indirectly (e.g. through DMA) controls the disk and memory to perform the data transfer. For general cases, the data transfer does not involve cache memory 102.

Referring to FIG. 2 there is shown a simple illustration of hardware and software stacks associated with a file I/O mechanism 200. The single node computer system 100 contains the operating system (OS) 201 and an interface for accessing the file server 203 through the Ethernet 202.

In the case of parallel supercomputers, however, the presence of multiple computation cores, multiple file I/O daemons and file servers makes the scheduling, assignments and allocation of file I/O disks or file servers very complex. Depending on any requirements (either large scale computation, file I/O) the number of compute nodes, associated file I/O daemons and file servers are varied to minimize or maximize the application initiated operations. One common procedure followed by parallel supercomputers in recent years to handle large-chunks of file I/O followed by a big phase of computation is by separating the computation and I/O operations and carrying them out by means of separate compute and I/O intensive processors. By assigning separate processors for computations and I/O operations it is easier not only to parallelize the computations and I/O operations, but it is also efficient to optimize and minimize many of the data distributions, hence minimizing any data traffic and operations between different computer processors and file servers.

Referring to FIG. 3 there is shown a typical compute node (CN) 301 (also referred to as a single node computer system 100 specializing in computation) and I/O node 302 (computer processor specializing in and running I/O daemons). A file server 203 for carrying out file I/O in a typical parallel supercomputer is also shown. The compute node kernel 201 interacts with a computation network 303 and an internal I/O network 304. This illustrates the separation of computation and I/O functionalities for a computer system with at least one node functioning as a compute node 301 and another node functioning as an I/O node 302. The dedicated I/O node 302 contains its own kernel 305 that supports normal file I/O operations.

Referring to FIG. 4 there is shown an example of a computing system optimized for high-performance file I/O that explores state-of-the-art technologies. The system is composed of three primary components: a cluster of compute nodes 301 (CN), a storage sub-system 402, and Ethernet fabric 403 that connects the cluster of compute nodes 301 to the storage sub-system 402. In the system, the storage sub-system 402 can be viewed as file servers to provide data to the compute nodes 301, which in turn can be viewed as file clients. The storage sub-system 402 is composed of magnetic disks 104 (physical persistent storage), and Network Shared Disks (NSD) 404 (a cluster of computers collectively optimizes the accesses to the disks). The disks connect to NSD 404 via a Storage Area Network (SAN) fabric 405 (a type of network designed to attach computer storage devices).

Referring now to FIG. 5, a dedicated computation network 501 is used for communication among compute nodes. Some compute nodes 301 are chosen as I/O aggregators 502. Among all the compute nodes, only the I/O aggregators 502 communicate to the backend file system, which is composed of an array of NSD (network shared disks) servers 404, the storage area network (SAN) fabric 405, and the actual disks 104. The interconnect between the I/O aggregators 502 and the NSD servers 404 is Ethernet 403.

In terms of a parallel I/O application programming interface, the most widely-used interface appears to be the POSIX file I/O interface (e.g. POSIX write( )/read( ) system calls). However, such an interface is not efficient enough for parallel I/O. First, it only supports contiguous I/O requests. Second, it does not provide any means for concurrent processes of a large-scale parallel application (usually using message passing for inter-process communication) to coordinate their I/O requests. Modern parallel file systems usually deliver high data-throughput for file I/O requests of disk data in large, contiguous chunks. On the other side, most data-intensive applications issue many file data requests having small-chunk, non-contiguous patterns. There is a requirement for a mechanism or method to handle these different scenarios in a manner that is transparent to a user.

Existing parallel file systems (for example GPFS) do a good job in terms of continuous and regular striped file access with large chunk I/O operations. However, for small chunk and irregular file access patterns frequently encountered for scientific applications, existing parallel file systems do not deal properly, leading to severe performance penalties.

Therefore, there is a need for a solution that meets such demands by delivering useful performance for massive parallel file systems.

SUMMARY OF THE INVENTION

Briefly, according to an embodiment of the invention a method for implementing large scale parallel file I/O processing includes steps or acts of: separating processing nodes into compute nodes and I/O nodes, wherein compute nodes are computer processors specializing in computation and I/O nodes are computer processors restricted to running I/O daemons; organizing the compute nodes and the I/O nodes into processing sets, the processing sets including: one dedicated I/O node corresponding to a plurality of compute nodes, wherein the plurality of compute nodes are evenly distributed across participating processing sets; assigning compute nodes from each processing set to become I/O aggregators to issue I/O requests to their corresponding I/O node, wherein the I/O aggregators are evenly distributed across the processing set; partitioning a file domain using a collective buffering technique wherein data is aggregated in memory prior to writing to a file; assigning portions of the partitioned file domain to the processing sets; receiving I/O related system calls in the compute nodes; sending the I/O related system calls to the corresponding I/O nodes; and processing the I/O related system calls through a system I/O daemon residing in the I/O node.

According to an embodiment of the present invention, a three-tier parallel file I/O system for carrying out the above steps includes: a first tier which includes at least one processing set; a second tier which is an array of network shared disks; and a third tier including a storage area network fabric and disks. The interconnection between the I/O nodes and the network shared disks is Ethernet and the connection between the second and third tier can be fiber channel, fiber-channel switch, or Ethernet. The backbone parallel file system is preferably a GPFS system.

BRIEF DESCRIPTION OF THE DRAWINGS

To describe the foregoing and other exemplary purposes, aspects, and advantages, we use the following detailed description of an exemplary embodiment of the invention with reference to the drawings in which.

Figure 1:
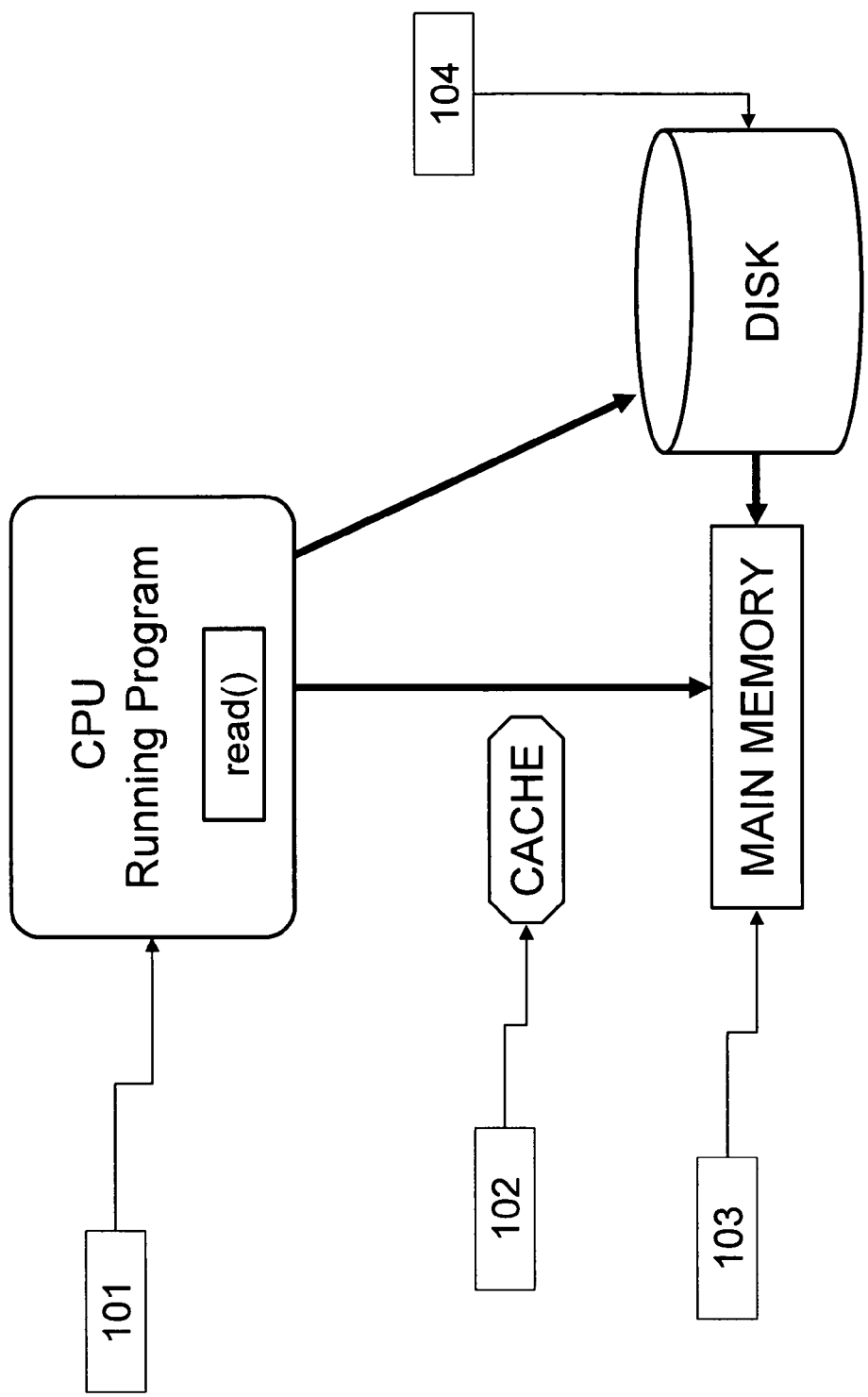
FIG. 1 shows a file I/O mechanism for a simple single-node computer system, according to the known art.
Figure 2:
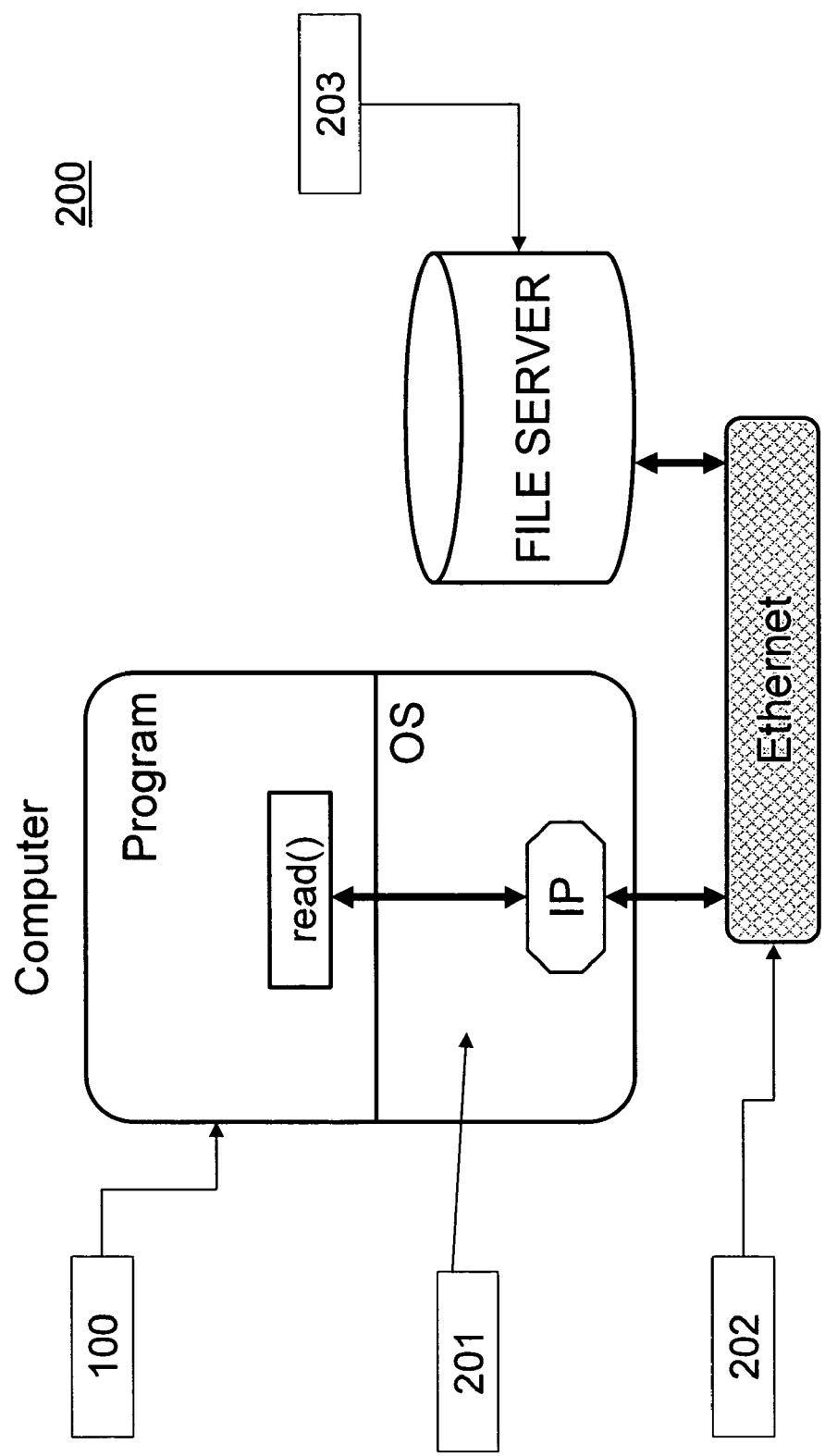
FIG. 2 provides the details of hardware and software stacks associated with a file I/O mechanism, according to the known art.
Figure 3:
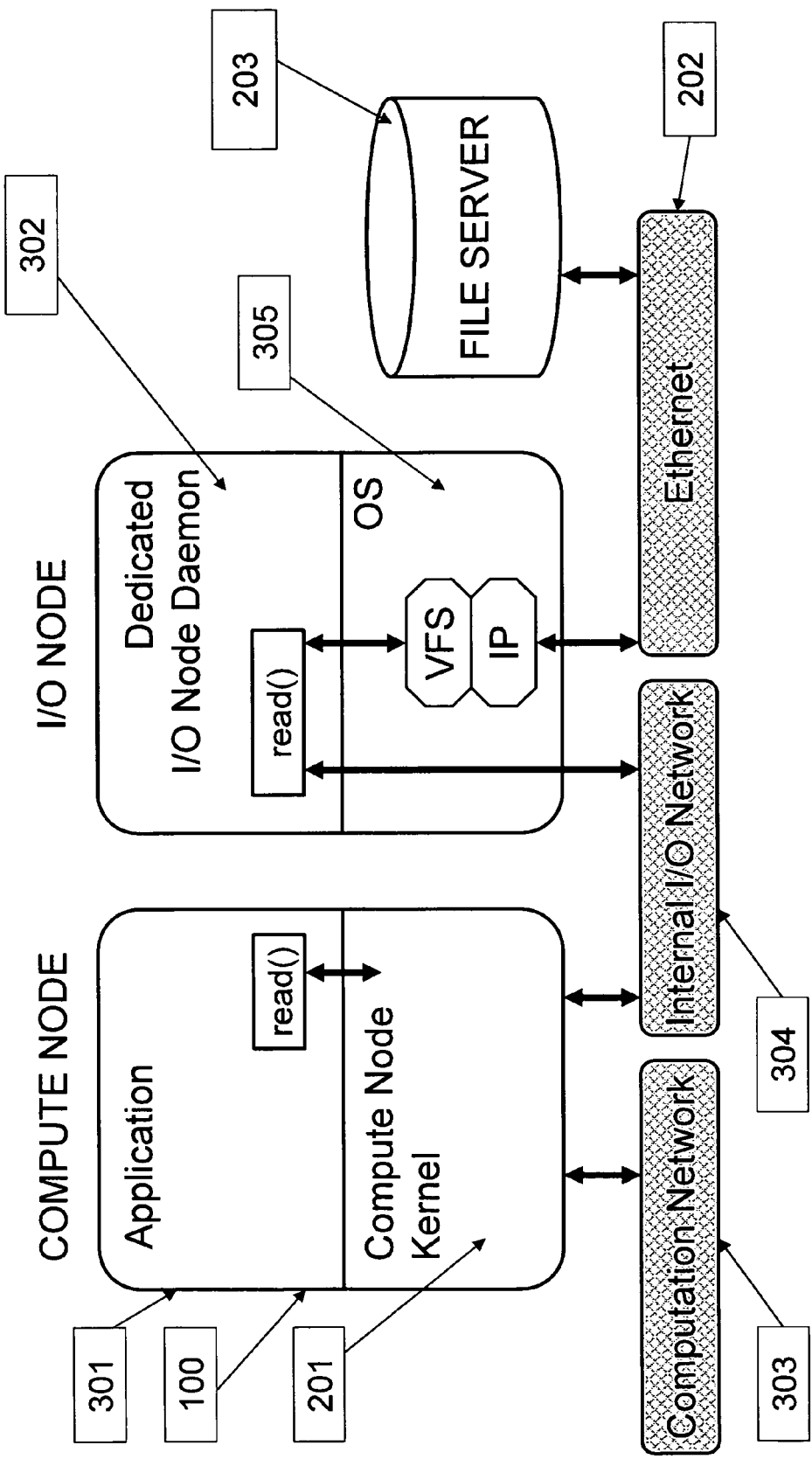
FIG. 3 explains the details of separation of computation and I/O functionalities for a computer system with at least one node functioning as a compute node and another node functioning as an I/O node, according to the known art.
Figure 4:
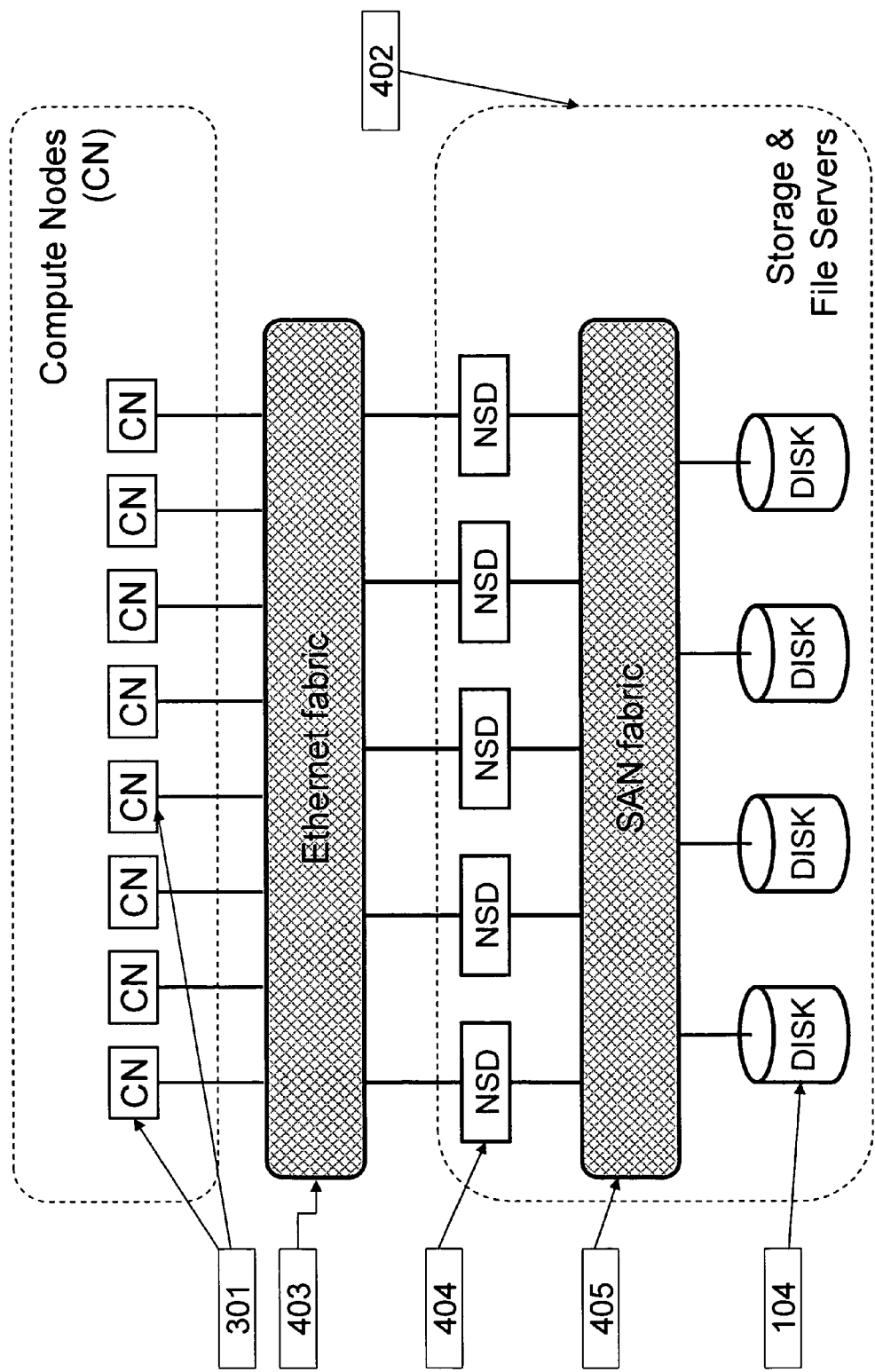
FIG. 4 extends the details of computation and I/O node mechanism extended to multimode computer systems, according to the known art.
Figure 5:
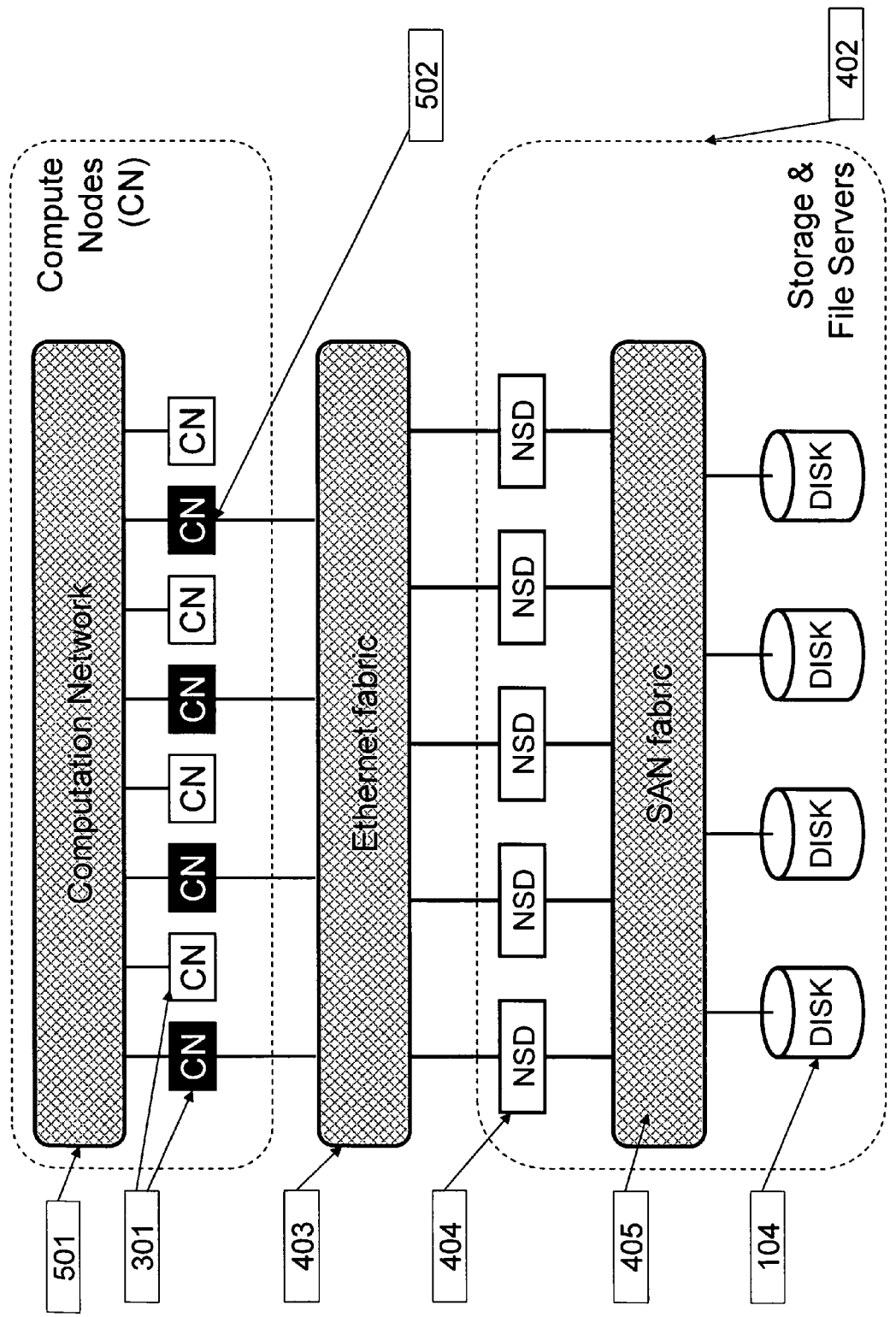
FIG. 5 illustrates I/O aggregators introduced within a parallel file system, according to the known art.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a method to support large-scale parallel programs for a seamless transfer of data between the main memory of computation processes and disks. The method according to an embodiment of the present invention supports the design, integration and implementation of a hierarchical scalable file I/O architecture for large scale parallel supercomputers with: (1) a parallel file system such as GPFS at the backend, and (2) an optimized implementation of MPI I/O as the preferable application programming interface while preserving the superior scalability of in-core computation.

Two key aspects of the present invention are: 1) a separation of computation and I/O at both hardware and software levels that enables predictable and eventually scalable I/O performance; and 2) an integrated three-tier file system for parallel file I/O solution for providing efficient and scalable disk-data access from system computation nodes.

The benefits derived from implementing a method according to an embodiment of the invention are: 1) predictable and scalable I/O performance; 2) efficient and scalable disk-data access from system computation nodes; 3) I/O accesses align to a parallel file system's data blocking boundaries and thereafter improve the file system's performance; and 4) support for parallel I/O atomic access mode.

Computation System:

From the computation system side, it is preferable that the I/O bandwidth provided by a platform is at par with the computation speed. Hence at a functional level there is a need to have a clear partitioning and cooperation of the computation and I/O requirements (at both hardware and software level), so that the system can adapt to various I/O demands from a large family of applications. For a pset the ratio of compute nodes to I/O nodes may vary within a range of 8:1 to 64:1, with the number of compute nodes being a power of two.

File System:

Similarly any backend file system should allow parallel applications to have concurrent access to the same files or different files, from nodes that mount the file system while delivering scalable I/O bandwidth. I/O systems by their nature are much more efficient for contiguous disk accesses than for non-contiguous or irregular accesses. Particularly, GPFS is highly optimized for large-chunk, regular (contiguous or regularly striped) I/O accesses. For more information on GPFS, refer to "GPFS: a shared-disk file system for large computing clusters," F. B. Schmuck and R. L. Haskin, in *Proceedings of Conference of Files and Storages Technologies* (FAST'02), 2002. Therefore, it is preferable for the I/O requests from compute nodes to be contiguous. As stated previously, pset (processor set) organization of compute and I/O nodes plays a key role for the Blue Gene/L I/O performance. Exploiting the collective buffering technique, MPI I/O collective operations provide opportunities for the pset structure of Blue Gene/L to be communicated, and an optimized file access pattern can be reached. The specific motivations for using the pset and collective buffering approach are two-fold. First, the best observed I/O performance of a Blue Gene/L partition containing multiple psets is often obtained when the I/O load is balanced across all of the I/O nodes. Second, for the case of a relatively large compute node to I/O node ratio (e.g. 64:1 on the LLNL system), the I/O performance of a pset reaches its peak when 8-16 compute nodes perform I/O concurrently, not all the compute nodes.

GPFS achieves its high throughput based on techniques such as large-block based disk striping, client-side caching, pre-fetching, and write-behind. In addition, it supports file consistency using a sophisticated distributed byte-range file-locking technique. GPFS has managed to limit the performance side-effect of the file locking operation with an aggressive optimization for block-level data-access operations.

File I/O Application Interface

To efficiently serve I/O requests encountered frequently in scientific applications (small-chunk with irregular patterns), we use MPI I/O to complement the GPFS-based solution. MPI I/O is the parallel I/O interface specified in the MPI-2 standard. Because of its support for much richer file access patterns and operations compared to POSIX I/O, MPI I/O is preferable for MPI based parallel programs. Particularly, MPI I/O includes a class of collective I/O operations (enabling a group of processes to access a common file in a coordinated fashion), which provide better flexibility for MPI I/O implementations to optimize I/O, by aggregating and/or balancing I/O loads in a transparent way (making the programming interface easy to use). As for our targeted parallel system, the organization of partitioned and balanced compute and I/O nodes is the key for delivering scalable I/O performance. The two phase implementation of MPI I/O collective operations provides opportunities for structure to be communicated, and an optimized access pattern can be reached.

A straight-forward implementation of the inter-processes data aggregation phase of the two phase implementation of MPI I/O collective operations is to use MPI point-to-point communication operations. While this implementation performs well for distributed or clustered environments, it can be further optimized for most parallel systems, since these systems usually provide efficient implementation of MPI collective operations. Here, we used MPI_Alltoall instead of MPI send/receive operations for the file data aggregation communication among the I/O aggregators and participating MPI processes. We have also tuned the implementation for participating MPI processes to exchange file access pattern information with a method that explores the high-performance collective communication primitives (MPI_Alltoall, MPI_Bcast, etc.) for the data aggregation among MPI processes and the I/O aggregators.

Figure 9:
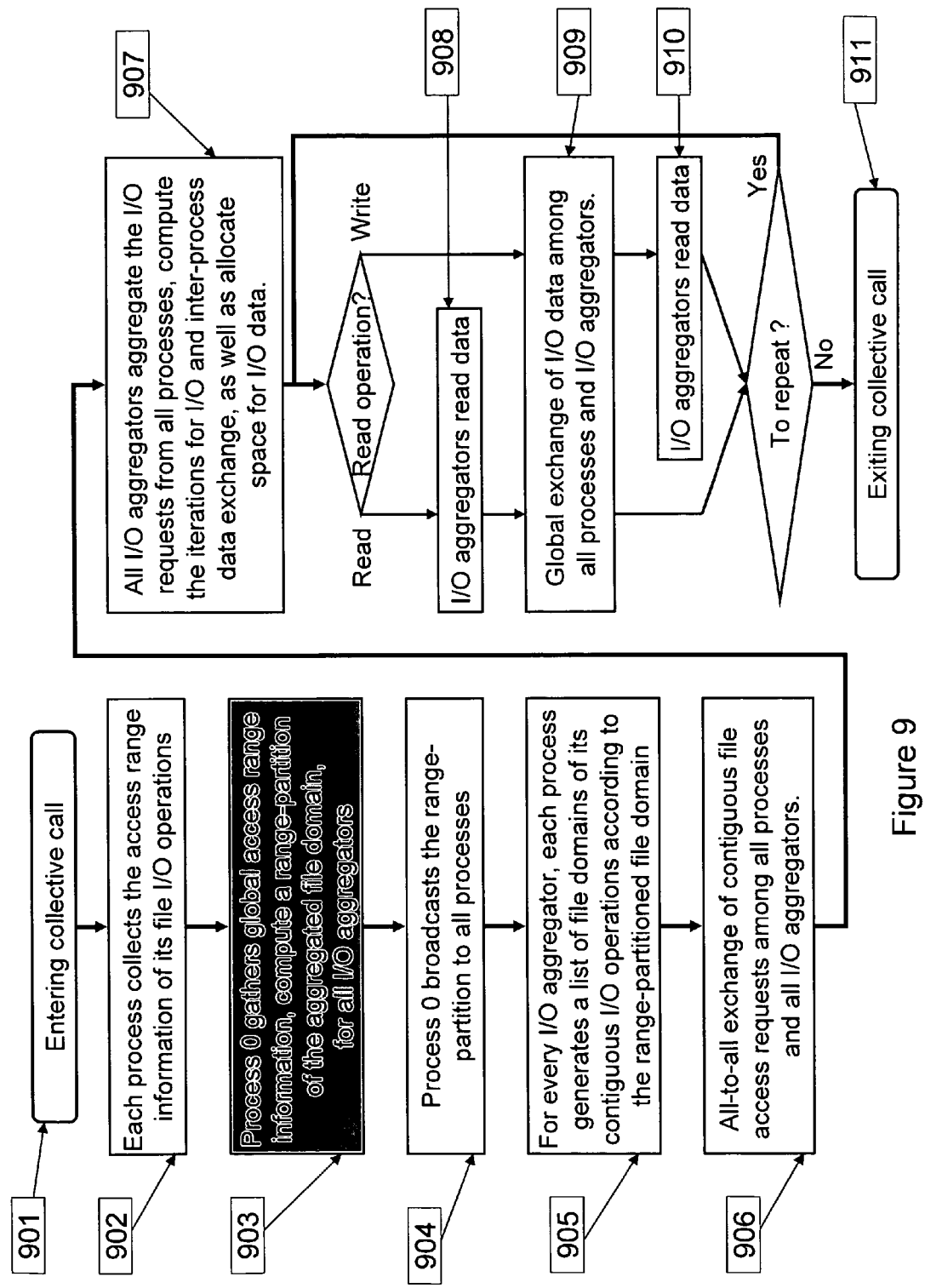
FIG. 9 is a flowchart of the MPI I/O process flow mechanism, according to an embodiment of the present invention.

The complete process for a collective MPI I/O call issued on the compute nodes is shown in the flowchart of FIG. 9. The process begins with the initiation of a collective call in step 901. In step 902, each process collects the access range information of its file I/O operations. In step 903, one process (process 0) gathers access range information from all processes that are participating in the collective call (global access range), specifies a list of I/O aggregators, and computes a range-based partition of the aggregated file range for all of the I/O aggregators. I/O aggregators are the set of compute processes (psets) that issue I/O operations. The I/O aggregators partition the I/O responsibilities for a file among themselves. In this step, the partition process, according to an embodiment of the present invention, is optimized so that I/O accesses of the I/O aggregators align to the parallel file system's data blocking boundaries. The exception is the beginning of the first I/O aggregator and the ending of the last I/O aggregator, which have to be aligned with the beginning and ending of the aggregated access range. A straight-forward implementation can perform this division based on the first and last file offsets of the collective access, so as to reach a balanced partition of the file region defined by the collective operation. With this file domain partitioning, the file access request of each compute process can be contiguous. In the case of having GPFS as the backbone file system, the major problem of the default file-partitioning method is that it may introduce data access requests whose sizes and offsets do not align to GPFS block boundaries, which will trigger additional file locking related activities. The file partitioning method according to an embodiment of the invention collectively computes a file partition among the I/O aggregators so that each I/O aggregator's file domain aligns to GPFS block boundaries in both size and offset. The effectiveness of this augmentation has been demonstrated in experiments.

In step 904 process 0 gathers the global access information and broadcasts the partition range information to all other processes. Step 905 constitutes generation of a list of file domains of the contiguous I/O operations according to the range-partitioned file domain for every I/O aggregator. In step 906 an all-to-all exchange of contiguous file access requests are established among all the processes and I/O aggregators.

In step 907 all I/O aggregators aggregate the I/O requests from all processes, and then compute schedules to stage I/O and inter-process data exchanges. The staging is because the total amount of I/O data accessed on each I/O aggregator may exceed the maximal buffer that can be allocated on it. When this is the case, the I/O operation and inter-process data exchange are staged into multiple iterations. This scheduling is to derive the maximal number of such iterations. Finally, in this step, each I/O aggregator allocates space for holding the I/O data for each stage. Before entering the next step the collective operations attempts to find out whether the collective I/O call is a read or write operation. Depending on the requirement it proceeds to step 908 or 909. Steps 908, 909, and 910 together comprise one iteration/stage of the I/O operation. Each of the iterations contains two types of operations: an I/O operation and an inter-process data exchange. When the collective call is a file read, steps 908 (I/O aggregators read data) and 909 (global exchange of I/O data among all processes and I/O aggregators) are taken. Otherwise, steps 909 and 910 are taken, which are the inverse of steps 908 and 909. If there are no more read/write operations, the collective call exits in step 911.

Separation of Computation and I/O:

A separation of computation and I/O at both hardware and software levels enables predictable and scalable I/O performance. For a parallel system, the partitioned and balanced compute and I/O nodes organization is the key for delivering scalable I/O performance. Our parallel system consists of separate compute nodes and I/O nodes with the compute nodes viewed as computation engines attached to I/O nodes.

Figure 10:
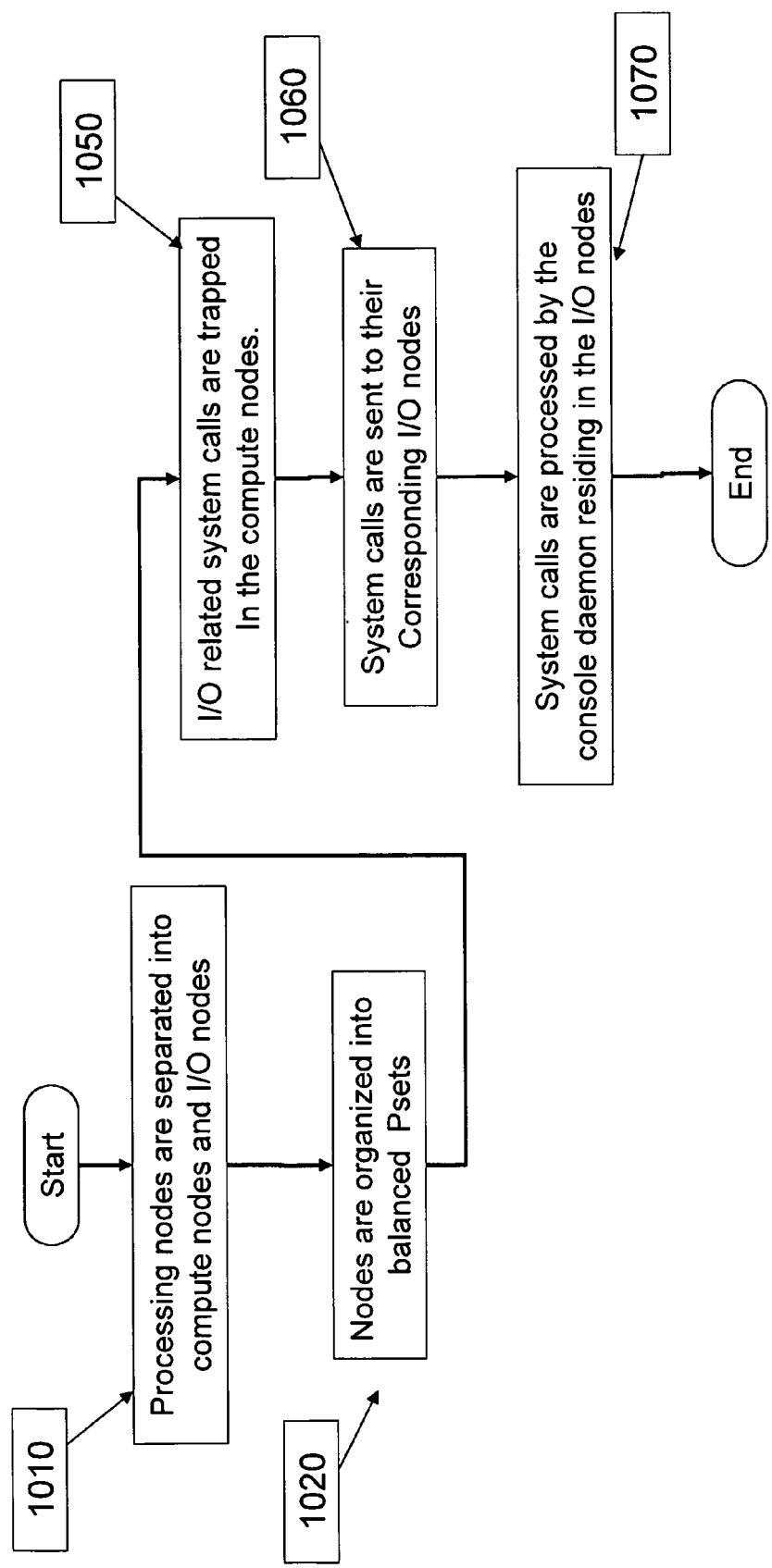
FIG. 10 is a flowchart of the method for separating the computation and I/O processes, according to an embodiment of the present invention.

Referring now to FIG. 10 there is shown a flowchart of the steps for separating the computation and I/O processes. In step 1010 the processing nodes are separated into processors that perform computations (compute nodes) and processors that only run I/O daemons (the I/O nodes). The compute nodes and I/O nodes are then organized into processing sets (psets) 1020, each of which contains one I/O node and a fixed number of compute nodes. The exact number of compute nodes in each pset depends upon the system configuration. The separation of the I/O nodes and the compute nodes, together with their organization into balanced processing sets, essentially provide the capability for scalable I/O demands.

Referring again to FIG. 10, in step 1050 I/O related system calls are trapped in the compute nodes. In step 1060 the system calls are sent to their corresponding I/O nodes and in step 1070 they are processed by a console daemon residing in their respective I/O nodes.

Figure 7:
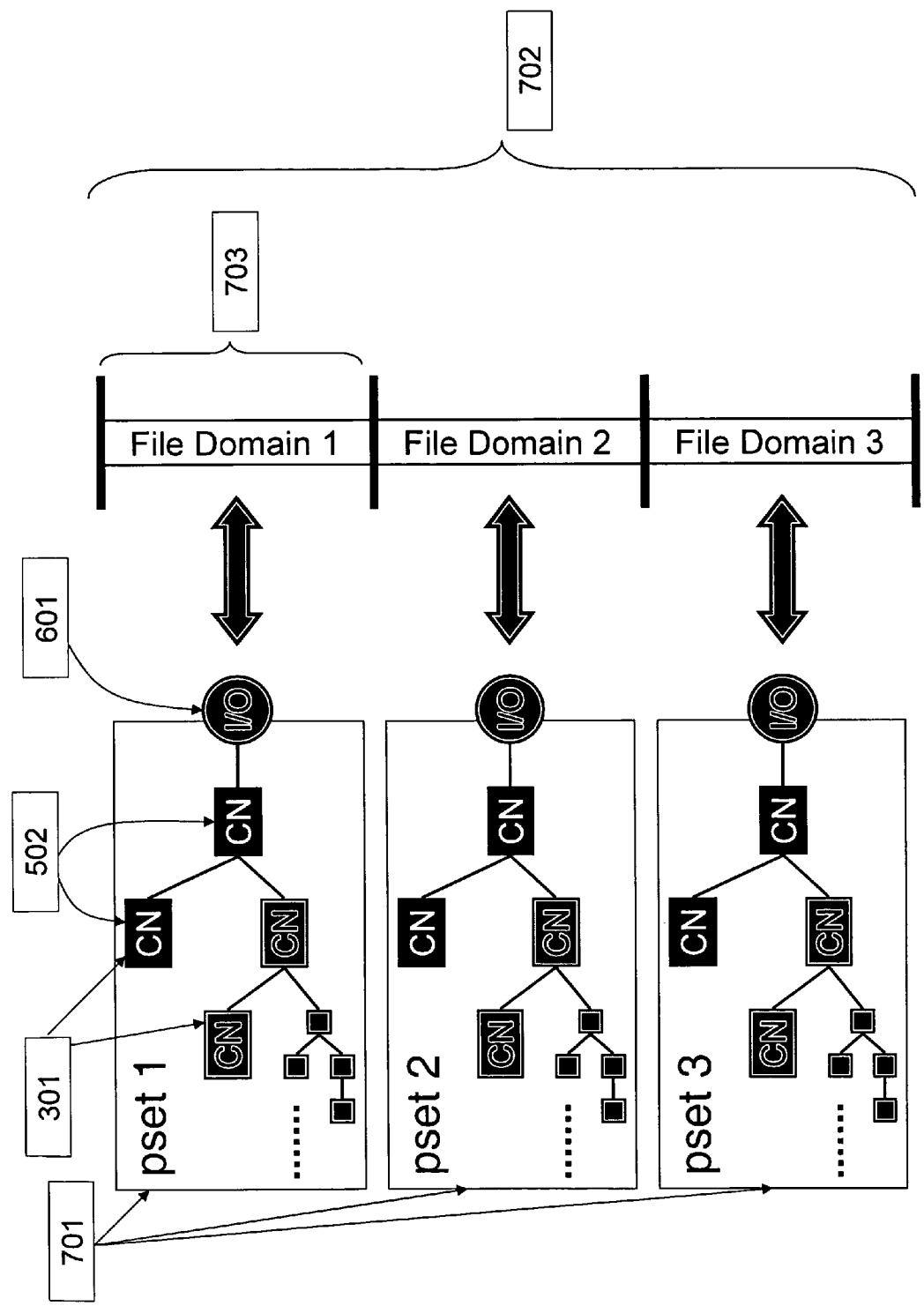
FIG. 7 explains the details of a file domain partitioning and alignment in a typical parallel file system, according to an embodiment of the present invention.

Referring to FIG. 7 there is shown an illustration of a mechanism for file domain partitioning according to an embodiment of the present invention. In the figure, the compute nodes (CN) 301 are organized into 3 processing sets (psets) 701. In each pset 701, a set of compute nodes 301 are selected as I/O aggregator 502. In this mechanism, I/O requests issued on the compute nodes 301 in a pset 701 are aggregated collectively on the I/O aggregators 502 and re-issued to the I/O nodes 601 by the I/O aggregators 502. And in turn, the software on the I/O nodes 601 forwards the I/O requests to the back-end file systems. During the I/O aggregation process, the mechanism partitions the aggregated file range 702 of all the I/O requests into file domains 703 (region of linear file defined by a pair of file offsets), with each corresponds to an I/O node 601.

Hierarchical Byte-Range File Locking

Figure 12:
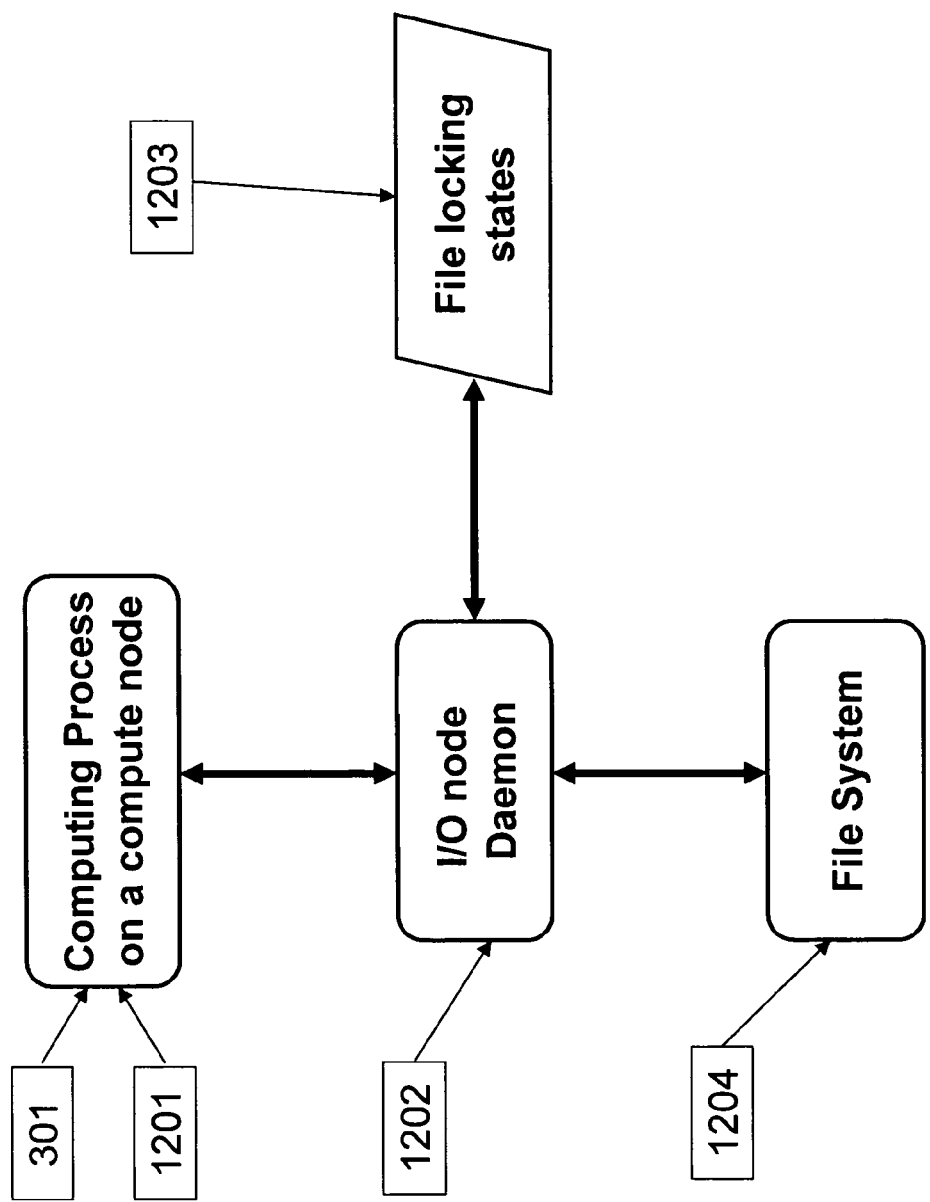
FIG. 12 is a flowchart of a high-level process of a byte-range file locking and unlocking mechanism with a dedicated I/O node daemon, according to an embodiment of the invention.

Shown in FIG. 12 is the high-level process of a byte-range file locking and unlocking mechanism with a dedicated I/O node daemon. The process starts when the computing process 1201 running on the compute nodes 301 issues a byte-range file locking request to the I/O node daemon 1202. The request can be a blocking request for obtaining a lock or releasing a lock. The byte-range is specified by a pair of file offsets. The I/O node daemon keeps file locking states 1203 of locks held by the compute nodes in the pset attached to the I/O node, and the requests are blocked by the file system and blocked by different compute nodes in the same pset. Based on the new request and the states kept in the I/O node daemon, the I/O node daemon will interact with the file system for forwarding the byte-range file locking requests, update the file locking states kept locally, or reply to the compute nodes.

Figure 8:
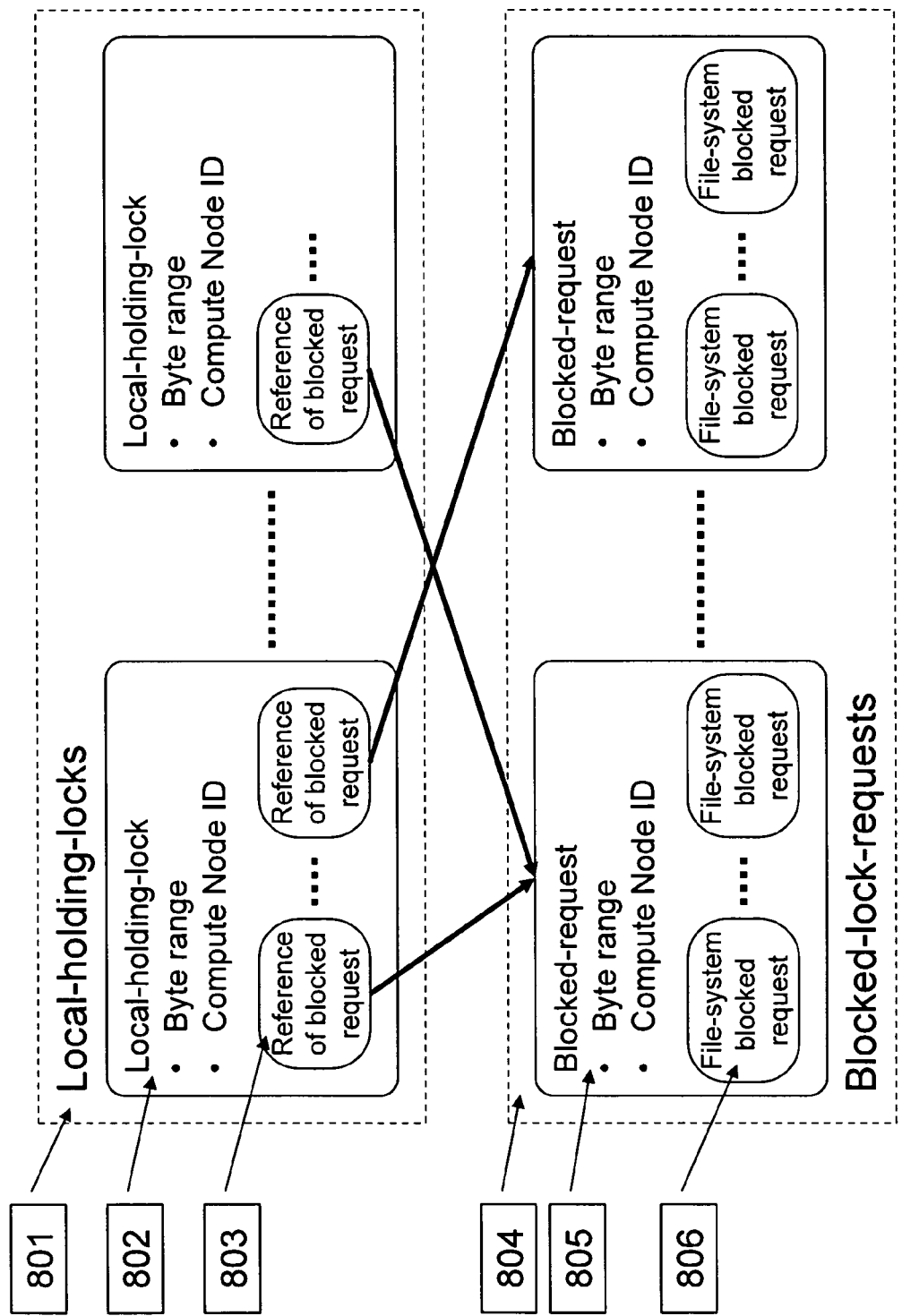
FIG. 8 illustrates the data structures involved in the file locking and unlocking mechanism with a dedicated I/O daemon, according to an embodiment of the present invention.

FIG. 8 shows the data structures maintained by the I/O node daemon for keeping file locking states. The data structure has two lists: local-holding-locks 801, and blocked-lock-requests 804. The local-holding-locks list 801 contains a list of records for local-holding-lock 802. The blocked-lock-requests list 804 contains a list of records for blocked-requests 805. The local-holding-lock record and blocked-request record both include the byte-range info of the holding file lock, compute node ID indicating the owning compute node of the lock. The local-holding-lock record contains a list of references to blocked-requests 803. These references are kept for the case when there are file locking requests that are blocked by the local-holding-requests. When the owning compute node releases a lock, the I/O node daemon can check the blocked-requests whose byte-range or sub-range overlap with the lock being released, and in turn decide if it can grant the locks to the blocked-requests. Each blocked-request record keeps a list of file-system blocked requests 806. For the case when part of the byte-range a lock request is blocked by local-holding-lock, the I/O node daemon accords to the list of file-system blocked requests to interact with the file-system.

Figure 11A:
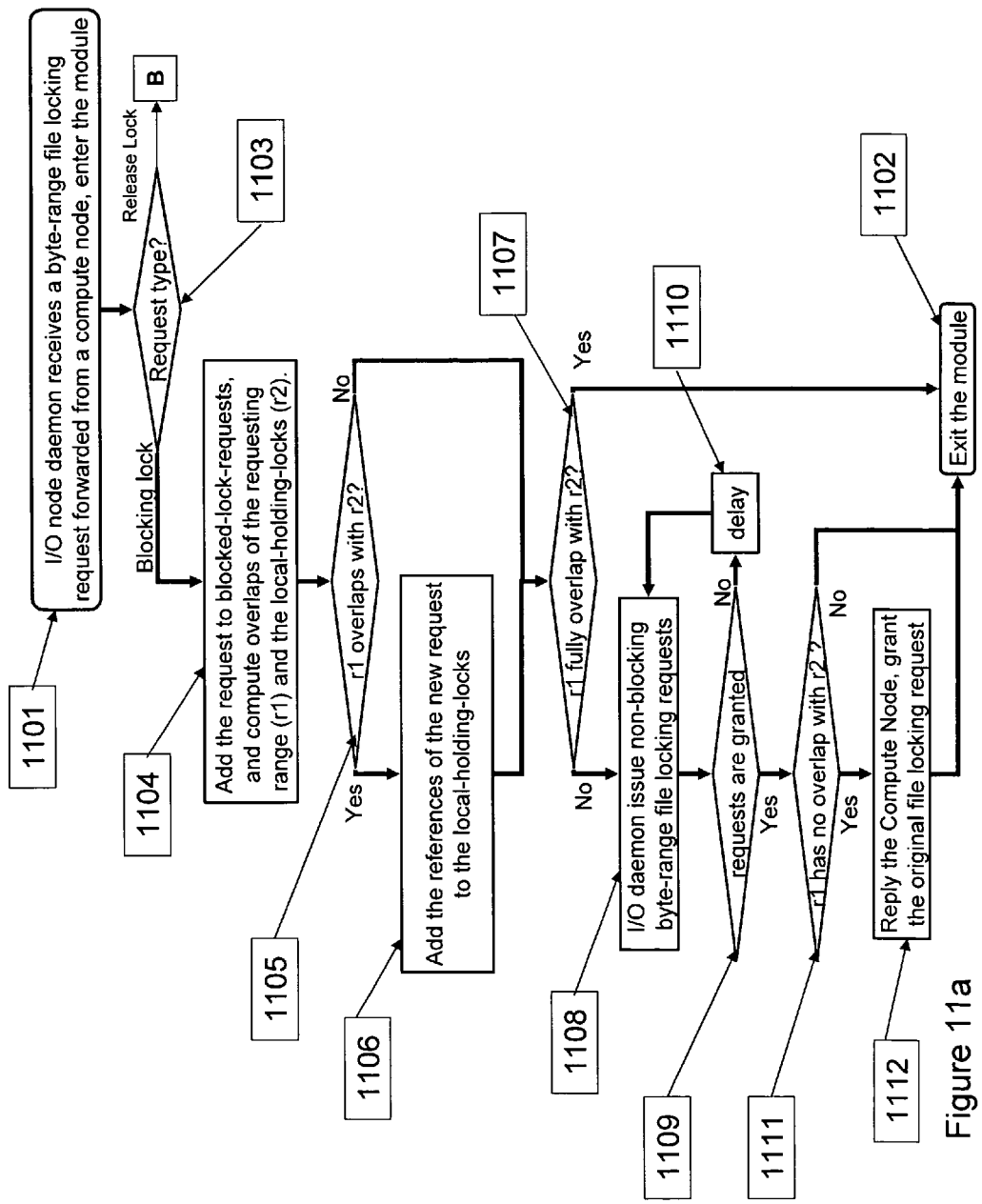
FIG. 11a is a flowchart of the path taken for a blocking byte-range file lock request, according to an embodiment of the present invention.
Figure 11B:
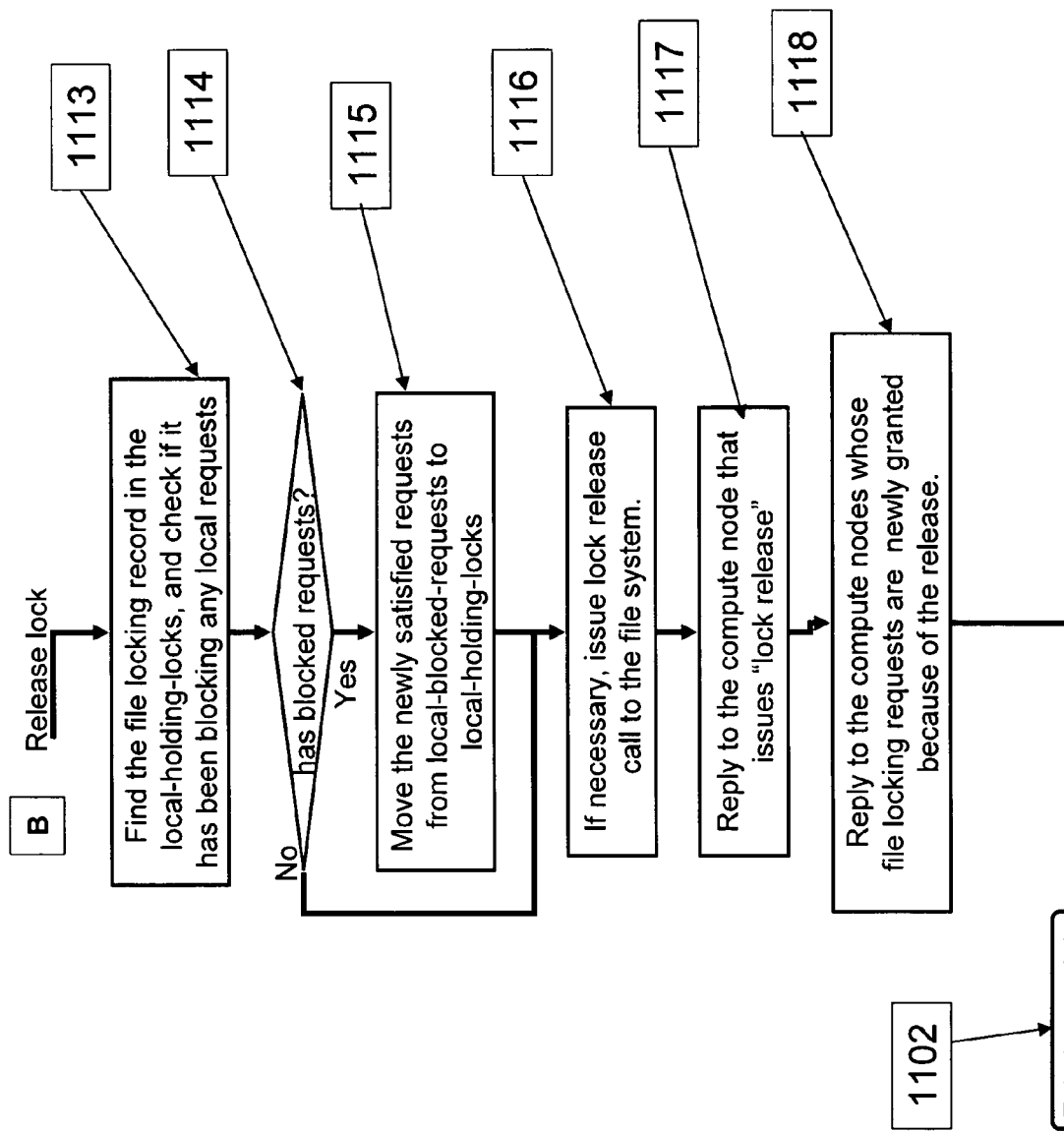
FIG. 11b is a flowchart of the path taken for a byte range file unlock request, according to an embodiment of the present invention.

FIGS. 11*a* and 11*b* are detailed flowcharts of an I/O node daemon processing file locking and unlocking requests. The functionality of handling file locking and unlocking is defined as a module in the I/O node daemon. Referring to FIG. 11*a*, the I/O node daemon enters the module when it receives a byte-range file locking request from a compute node 1101.

The I/O node daemon exits the module in step 1102. Step 1103 check the request type. If the request is a blocking lock request, steps 1104 to 1112 are executed. If the request is a lock release request, steps 1113 to 1118 are executed as shown in FIG. 11b.

Step 1104 first registers the newly incoming file locking request into the blocked-lock-requests list 804. Then it computes the overlaps of the file byte-range of the new request and those in local-holding-locks. This step is to determine if there is any local-holding-lock record holding the complete or part of the byte-range of the new request. And thereafter indicating the part of the file region of new request is locked by other compute nodes in the same pset as the compute node who issued the new request.

Step 1105 tests if there is an overlap between the new request and the local-holding-locks. When the test returns TRUE, step 1106 adds the references to the new request in the blocked-lock-requests to the local-holding-locks. Step 1107 tests if the new request is blocked and only blocked by the local-holding-locks, i.e. there is no need to call to file-system to request locks. If the test returns TRUE, the I/O node daemon will exist the module without replying the compute node that issues the request. If the test returns FALSE, meaning part of the byte-range of the lock request is not held locally (held by the compute nodes in the same pset), step 1108 issues non-blocking file locking calls (essentially to the back-end file system).

Step 1109 checks the return value of the non-blocking file locking calls. If it returns false, the I/O node daemon will re-issue the non-blocking requests after a delay 1110. If the test in 1109 returns TRUE, and there is no local-holding-locks has byte-ranges overlapping with the in-process request (test 1111), the I/O node daemon replies the compute node that issues the request, and grant the lock requested 1112. If the test 1111 returns FALSE, meaning part of the byte-range of the in-process request is locked by compute nodes in the same pset, the I/O node daemon exit the module 1102. The in-process lock request will be granted when other compute nodes in the same pset release corresponding locks.

Referring now to FIG. 11b, when the I/O node daemon receives a request for releasing locks, step 1113 first locates the file locking record in the local-holding-locks list 801 and check if it has been blocking any locking requests issued from the compute nodes in the same pset. If the test 1114 returns TRUE, step 1115 grants the lock to the pending requests in the blocked-requests list, and move the records to local-holding-locks list. If part or all of the byte-range of the in-releasing lock is not requested by the records in the blocked-requests list, step 1116 issues lock release call. Step 1117 reply to the compute node that issues the lock release call. Then step 1118 replies to the compute nodes whose pending file locking requests is just been granted.

Figure 6:
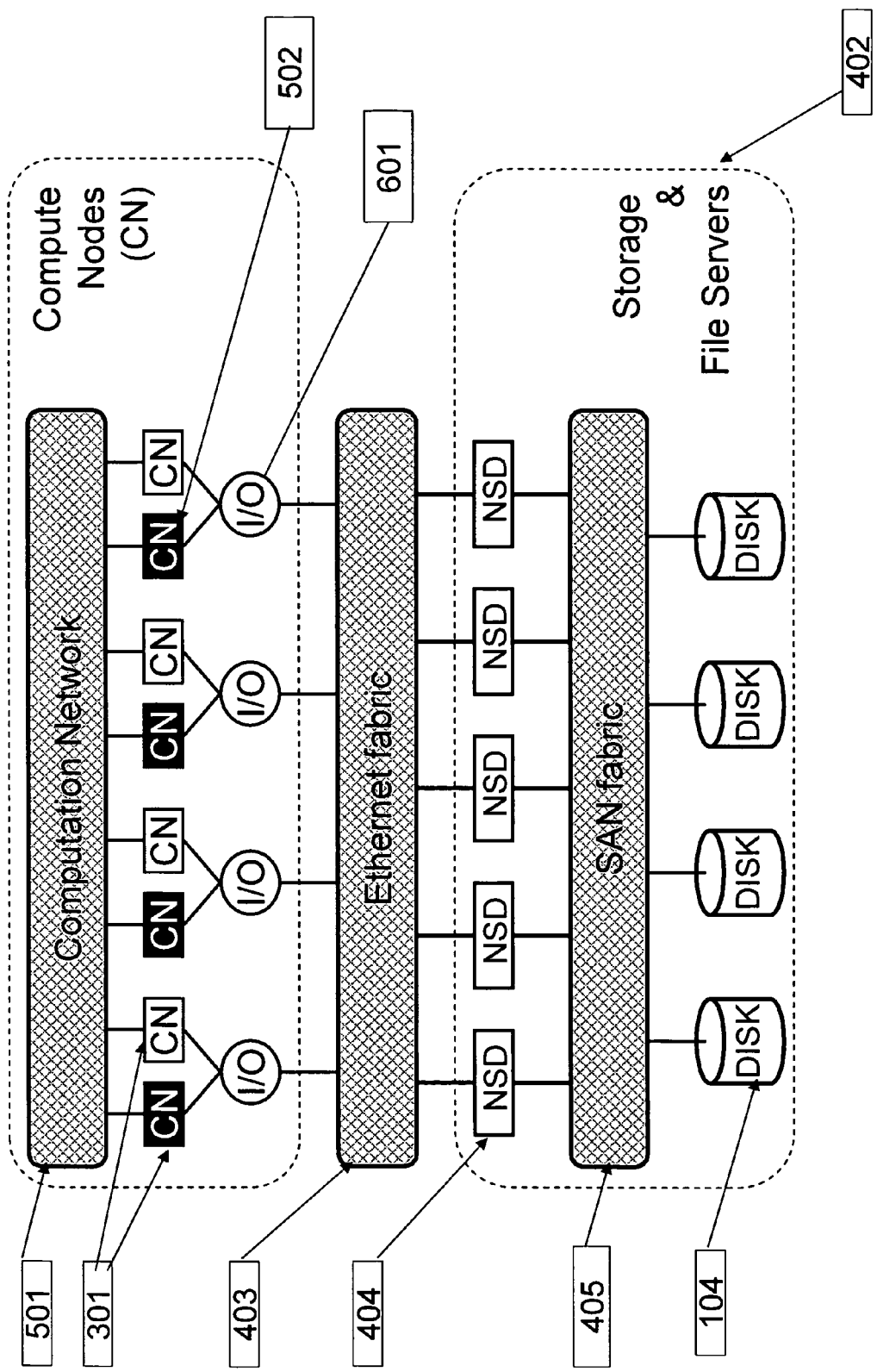
FIG. 6 provides an alternative design/method for I/O aggregators applicable for a parallel file system, according to an embodiment of the present invention.

Integrated Three-Tier File System:

Referring now to FIG. 6, there is shown I/O aggregators introduced within three-tier GPFS-based parallel file I/O architecture according to an embodiment of the present invention. The first tier of the architecture consists of I/O nodes 601 as GPFS clients, whereas the second tier is an array of NSD (network shared disks) servers 404 which essentially provide a virtualization of the backend storage resources. The third tier consists of the storage area network (SAN) fabric 405 and the actual disks 104. The interconnect between the I/O nodes 601 and the NSD servers 404 is the Ethernet 403, while the connection between the second and third tier can be either fiber channel, fiber-channel switch or Ethernet (iSCSI). The choice of NSD servers 404, SAN fabric 405 and storage devices depend on the customer requirements.

An integrated three-tier parallel file I/O solution provides efficient and scalable disk-data access from system computation nodes 301. The scalable parallel I/O solution according to the present invention uses a Parallel File System such as GPFS as the backbone file system. It allows parallel applications' concurrent access to the same files or different files, from nodes that mount the file system. Up to the present time, the largest GPFS cluster that has been tested contains several thousand Linux nodes.

Existing parallel file systems (for example GPFS) do a good job in terms of continuous and regular striped file access with large chunk I/O operations. However, for small chunk and irregular file access patterns frequently encountered for scientific applications, existing parallel file systems do not deal properly, leading to severe performance penalties. The approach implemented according to the invention in optimizing MPI I/O collective operations complements the performance constraint of modern large scale file system and handles I/O requests of small chunks and non-contiguous data access frequently encountered in applications. Specifically, our approach aggregates data in memory prior to writing to files, which reduces the number of disk accesses.

The two phase implementation of MPI I/O collective operations provide opportunities for structure to be communicated, and an optimized access pattern can be reached.

Therefore, while there has been described what is presently considered to be the preferred embodiment, it will understood by those skilled in the art that other modifications can be made within the spirit of the invention.

We claim:

1. A method for implementing large scale parallel file input/output (I/O) processing; the method comprising steps of:
   separating processing nodes into compute nodes and I/O nodes, wherein compute nodes are computer processors specializing in computation and I/O nodes are computer processors restricted to running I/O daemons;
   organizing the compute nodes and the I/O nodes into processing sets, the processing sets comprising:
   one dedicated I/O node corresponding to a plurality of compute nodes, wherein the plurality of compute nodes are evenly distributed across participating processing sets;
   assigning compute nodes from each processing set to become I/O aggregators to issue I/O requests to their corresponding I/O node, wherein the I/O aggregators are evenly distributed across the processing set;
   partitioning a file domain using a collective buffering technique wherein data is aggregated in memory prior to writing to a file;
   assigning portions of the partitioned file domain to processing sets;
   receiving I/O related system calls in the compute nodes;
   sending the I/O related system calls to the corresponding I/O nodes; and
   processing the I/O related system calls through a system I/O daemon residing in the I/O node.

2. The method of claim 1 further comprising a step of implementing a byte range file locking agent in the system I/O daemon running the I/O nodes such that conflicting locking requests among the compute nodes in the same processing set can be solved without the I/O node communicating with the file system.

3. The method of claim 1 wherein the processing sets are organized with a fixed number of compute nodes, the number depending upon the system configuration.

4. The method of claim 3 wherein an optimal ratio of I/O node to compute nodes depends on I/O bandwidth requirements.

5. The method of claim 1 wherein the partitioning is a static partitioning.

6. The method of claim 1 wherein the organizing step further comprises MPI point-to-point communication operations.

7. The method of claim 6 wherein MPI$_{13}$ Alltoall is used for file data aggregation communication among the I/O aggregators and participating MPI processes.

8. The method of claim 1 wherein the partitioning step further comprises a process for the I/O aggregators to partition I/O responsibilities for a file among themselves.

9. The method of claim 8 wherein the process further collectively computes a file partition among the I/O aggregators such that the I/O aggregator's file domain aligns to data block boundaries of a parallel file system in both size and offset.

10. The method of claim 9 wherein the process further comprises steps of:
    aligning a begin point and an end point of an access range of the I/O aggregator to the data block boundary;
    aligning a beginning of a first I/O aggregator to a beginning of the access range;
    and
    aligning an ending of a last I/O aggregator to an ending of the access range.

11. The method of claim 1 wherein aggregating the data in memory further comprises steps of:
    all I/O aggregators aggregating the I/O requests from all processes;
    each of the I/O aggregators computing schedules to stage I/O and inter-process data exchanges in order to determine if a total amount of data accessed on each of the I/O aggregators exceeds a maximum buffer size;
    staging the I/O and inter-process data exchanges in multiple iterations if it is determined that the total amount of I/O data exceeds the maximum buffer size; and
    each of the I/O aggregators allocating space for holding the I/O data for each stage.

12. A parallel file I/O system comprising:
    a first tier comprising:
      at least one processing set comprising:
      one dedicated I/O node corresponding to a plurality of compute nodes;
      wherein the compute nodes are computation engines of the one dedicated I/O node, and wherein some of the plurality of the compute nodes are selected to become I/O aggregators to issue I/O requests to the one dedicated I/O node;
      wherein the one dedicated I/O node is a computer processor restricted to running I/O daemons;
      wherein the compute nodes from each processing set are assigned to become I/O aggregators to issue I/O requests to their corresponding I/O node, wherein said I/O aggregators are evenly distributed across the processing set;
      wherein the I/O related system calls are received in the compute nodes and sent to their corresponding I/O node;
    a file domain partitioned using a collective buffering technique wherein data is aggregated in memory prior to writing to a file, wherein portions of the partitioned file domain are assigned to the at least one processing set;
    a second tier comprising an array of network shared disk servers;
    a third tier comprising a storage area network fabric and disks;
    an interconnection between the one dedicated I/O node and the network shared disks;
    a connection between the second and the third tier; and
    a backbone parallel file system.

13. The system of claim 12 wherein the interconnection between the I/O nodes and the network shared disk servers is Ethernet.

14. The system of claim 12 wherein the connection between the second and third tiers is selected from a group consisting of: fiber channel, fiber-channel switch, and Ethernet.

15. The system of claim 12 wherein the backbone parallel file system is a GPFS parallel file system.

16. The system of claim 12 further comprising:
    a system I/O daemon running the I/O nodes.

17. The system of claim 16 wherein the system I/O daemon further comprises:
    a byte range file locking agent such that conflicting locking requests among the compute nodes in the same processing set can be solved without the I/O node communicating with the file system.

18. The system of claim 12 wherein the at least one processing set is organized with a fixed number of compute nodes evenly distributed across participating processing sets, the fixed number depending upon the system configuration.

19. The system of claim 18 wherein an optimal ratio of I/O node to compute nodes depends on I/O bandwidth requirements.

* * * * *